United States Patent [19]

Negishi et al.

[11] Patent Number: 4,775,102
[45] Date of Patent: Oct. 4, 1988

[54] SPACE HEATING SYSTEM UTILIZING ENGINE EXHAUST HEAT

[75] Inventors: Shigeyuki Negishi, Saitama; Toshiaki Nagashima, Ibaraki; Hideaki Nakagawa, Koga, all of Japan

[73] Assignee: Sanoh Kogyo Kabushiki Kaisha, Tokyo, Japan

[21] Appl. No.: 131,912

[22] Filed: Dec. 11, 1987

[30] Foreign Application Priority Data

Dec. 16, 1986 [JP] Japan ........................... 61-297494
Aug. 27, 1987 [JP] Japan ........................ 62-130455[U]
Aug. 27, 1987 [JP] Japan ........................ 62-130456[U]
Aug. 27, 1987 [JP] Japan ........................ 62-130457[U]

[51] Int. Cl.⁴ .............................................. B60H 1/02
[52] U.S. Cl. .............................. 237/12.3 A; 237/2 A; 165/104.14
[58] Field of Search ............ 237/2 A, 12.3 A, 12.3 C; 165/104.11, 104.21, 104.14, 104.27, 104.32, 104.13

[56] References Cited

U.S. PATENT DOCUMENTS 4,667,876 5/1987 Negishi .

FOREIGN PATENT DOCUMENTS

52-24617 2/1977 Japan .

Primary Examiner—Henry A. Bennet
Attorney, Agent, or Firm—Stevens, Davis, Miller & Mosher

[57] ABSTRACT

In a motorcar space heating system of the type having a heat pipe comprising a heat absorbing element for receiving heat from the exhaust gas of the motorcar engine and a heat discharging element for heating air flowing into a car interior space to be heated, the heat pipe is separated, at an intermediate heat exchanger installed in a working fluid passage connecting the heat absorbing and discharging elements, into a heat absorbing section and a heat discharging section. The working fluids within these two sections are therefore not intermingled with each other. A pipe extends from the intermediate heat exchanger so as to be communicative at one end thereof with the heat absorbing section. The other end of the pipe extends into a working fluid reservoir tank. When the pressure within the heat absorbing section rises as a result of increase of the quantity of heat absorbed at the heat absorbing element, the working fluid is allowed to flow through the pipe into the reservoir tank and is stored therein in liquid form. When the pressure within the heat absorbing section is reduced, the liquid working fluid in the reservoir tank flows back into the heat pipe.

13 Claims, 5 Drawing Sheets

SPACE HEATING SYSTEM UTILIZING ENGINE EXHAUST HEAT

BACKGROUND OF THE INVENTION

This invention relates generally to space heating and more particularly to a space heating system which utilizes the heat in the exhaust gas of an engine.

More specifically, the invention concerns a space heating system in which a combination of a heat transferring or heat transmitting pipe known as "heat pipe" or thermosyphon is used to receive, at its one end, heat in the exhaust gas flowing through the exhaust pipe of an engine and to transmit this heat to its other end disposed in the air duct thereby to heat air flowing through this duct into a space to be heated.

The space heating system of this invention is applicable to the heating of spaces which are reasonably near fuel-combustion type engines. A typical example of such spaces is an interior space of an engine-driven land vehicle such as a motorcar and a water surface craft.

Systems for heating interior spaces of engine-driven vehicles of the general type mentioned above employing heat pipes with heat receiving or absorbing elements for installation in engine exhaust pipes and heat discharging elements for installation in air ducts are known, as disclosed in Japanese Patent Laid-Open Publication (Kokai) No. 24617/1977. Similar systems are also disclosed in U.S. Pat. No. 4,667,876 to S. Negishi et al.

In such type of system for heating vehicle interiors, the heat pipe itself is of a sealed type, and its interior, after being evacuated is supplied with water or some other working fluid and sealed.

In the case of a heat pipe of this sealed type, in the event that for some reason the temperature within the engine exhaust pipe rises excessively, whereby the vapor pressure of the working fluid within the heat pipe rises excessively, there is the possiblity of damage or rupturing of the heat pipe.

SUMMARY OF THE INVENTION

In view of the above described problem encountered in the prior art, this invention contemplates providing a solution to the above described problem by providing a space heating system in which there is provided a heat pipe comprising a heat absorbing element for installation in an engine exhaust pipe, a heat discharging element for installation in an air heating duct for supplying heated air into a space to be heated, and a working fluid passage means joining these heat absorbing and heat discharging elements, the heat absorbing section and the heat discharging section of the working fluid passage means being separated or isolated at an intermediate heat exchanger so as to make possible heat exchange between these two sections, and the heat absorbing section being made communicative via a pipe communicating with the atmospheric pressure to a working field reservoir tank which is open to the atmosphere, whereby the heat absorbing section of the heat pipe is formed as a thermosyphon of open type.

By the use of the space heating system of the above described organization according to this invention, if the temperature within the engine exhaust pipe should rise excessively, the working fluid within the working fluid pipe on the heat absorbing section thereof flows out through the pipe communicating with the atmospheric pressure into the reservoir tank, whereby the pressure within the heat pipe is prevented from becoming excessive. When the pressure within the heat pipe becomes less than atmospheric pressure, the working fluid collected in the reservoir tank is returned by reverse flow by suitable means into the working fluid pipe of the heat pipe.

In order to regulate at a constant value the rate of heat exchange at the intermediate heat exchanger mentioned hereinbefore, a vapor condenser and the reservoir tank may be successively connected through appropriate piping. Then, when the pressure within the heat absorbing section rises, the vaporized working fluid within the intermediate heat exchanger is conducted into the condenser and condensed into the liquid working fluid, which is collected in the reservoir tank, while, when the pressure within the heat absorbing section decreases, the liquefied working fluid within the reservoir tank is returned by syphon action by way of the condenser into the heat absorbing section.

In a vehicle interior heating system of this character, it is a common practice to use the engine cooling water for the liquefying of the working fluid in the condenser. However, in the case where the temperature of the cooling water rises because of a long period of driving or some other reason, the vaporized working fluid from the intermediate heat exchanger is not liquefied in the condenser but is sent as it is to the reservoir tank, in which it causes boiling. As a consequence, the working fluid within the reservoir tank returns into the heat absorbing section, and the heat exchange rate at the intermediate heat exchanger cannot be regulated at a constant value.

This problem can be solved by an embodiment of this invention.

The operation of the system stated hereinbefore cannot be readily stopped during periods when heating is not required. Further, since the liquefied working fluid within the reservoir tank is to be returned to the heat pipe as described above, the reservoir tank is ordinarily open to the atmosphere, and the heat absorbing section is also open to the atmosphere. In the case of the heat pipe open to the atmosphere, however, the evaporation temperature (boiling point) of the working fluid therewithin is higher than that in a system of known sealed type, it fails to operate in the case when, for example, the engine has not yet warmed up fully, and the exhaust gas temperature is low, whereby rapid heating of the vehicle interior is not possible.

The above stated problems can be solved by another embodiment of this invention.

One method for improving the heating efficiency of a system of the instant character is to install a heater core in the air duct at a point upstream from the heat discharging element of the heat pipe. The engine cooling water, after cooling the engine, is circulated through this heater core, which operates to transfer the heat in the cooling water to the air flowing through the duct, thereby functioning as a preheater. The engine cooling water leaving this heater core is conducted to the above mentioned condenser.

In a space heating system of this type, in order to regulate the rate of heat exchange at the heater core, a common practice is to install a control valve on the inlet side for the engine water of the heater core thereby to control the rate of heat supplied by the engine cooling water to the heater core. However, when the lever for regulating the temperature of the room to be heated is set at "FULL COOL" position, the above mentioned control valve is fully closed, and the supply of the engine cooling water by way of the heater core to the condenser is shut off. Consequently, the supply of new engine cooling water to the condenser is also stopped, whereby the temperature of the stagnant cooling water within the condenser rises, whereupon the vaporized working fluid from the intermediate heat exchanger is not liquefied in the condenser and is sent as it is into the reservoir tank to cause evaporation of the fluid in the reservoir tank.

This problem can also be solved by still another embodiment of this invention.

In a space heating system in which an open type heat pipe is used, the pressure within the heat pipe is automatically adjusted thereby to prevent damage or breakage even when the rate of heat absorption at the heat absorbing element becomes excessive. Moreover, the rate of heat discharge at the heat discharging element is restrained from becoming excessive by the flowing out of the working fluid. However, since there is no means for fully stopping the functioning of the heat pipe, the turning on and off of the heating cannot be carried out instantaneously and positively.

Furthermore, in the case where an antifreeze liquid such as ethylene glycol has been added to the working fluid, the antifreeze liquid remains until the last within the heat absorbing element of the heat pipe, and there is the possibility of decomposition of the antifreeze liquid by the heat of the engine exhaust gas.

Further embodiments of this invention serve to solve the above stated problems.

The nature, utility, and further features of this invention will become more clearly apparent from the following detailed description with respect to preferred embodiments of the invention when read in conjunction with the accompanying drawings, briefly described below.

DETAILED DESCRIPTION OF THE INVENTION

Figure 1:
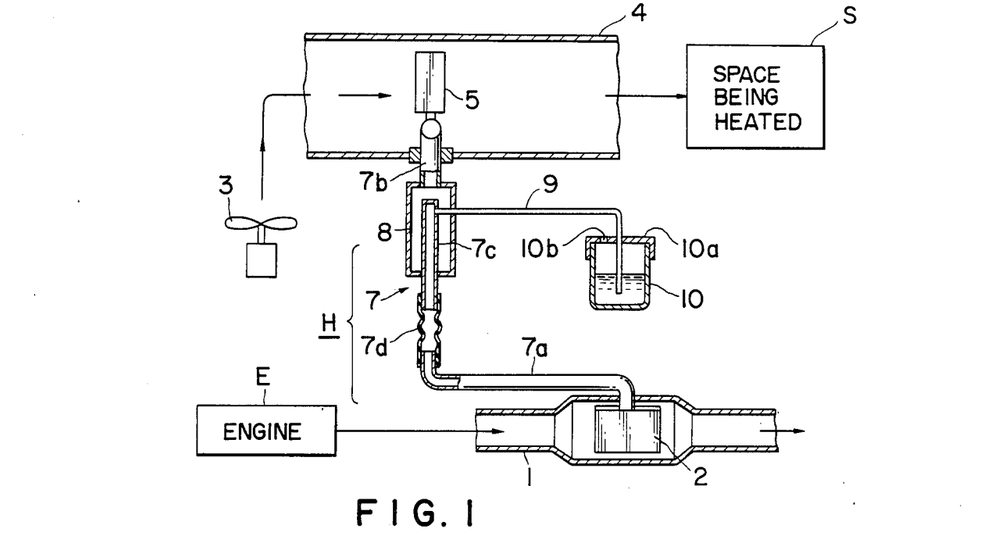
FIG. 1 is a schematic diagram, with parts shown in vertical section and certain parts cut off, showing the essential parts of one form of the space heating system according to this invention.

Referring first to FIG. 1, the functional object of the space heating system of this invention is to heat a space S, which is typically a motor vehicle interior space, with heat derived from the exhaust gas of an engine E of the motor vehicle, that is, to transfer heat from the interior of the exhaust pipe 1 of the engine E to the interior of an air duct 4 and thence to the space S. For this purpose, the principal component of the system is a so-called heat pipe H comprising, essentially, a heat receiving or absorbing element 2 installed within the exhaust pipe 1, a heat radiating or discharging element 5 installed within the air duct 4, and a working fluid passage 7 interconnecting the heat absorbing element 2 and the heat discharging element 5.

Both the heat absorbing element 2 and the heat discharging element 5 are provided around their external surfaces with fins (not shown) for increasing their respective heat-exchange efficiencies. The heat pipe H contains a sealed-in working fluid such as water, which, in the heat absorbing element 2, absorbs heat by heat exchange from the exhaust gas within the exhaust pipe 1 and evaporates, its heat being conducted to the heat discharging element 5 through the working fluid pipe 7. The heat discharging element 5 thereby receives heat and gives up this heat by heat exchange to the air caused to flow through the heated air duct 4 by a fan 3. The air thus heated is then conducted through the air duct 4 into the space S.

The working fluid passage 7 comprises a pipe 7a communicating at one end thereof directly with the heat absorbing element 2, a pipe 7b communicating at one end thereof directly with the heat discharging element 5 and having an enlarged closed end part 8 at its other end, a pipe 7c closed at one end thereof and enclosed in the enlarged end part 8 of the pipe 7b, and a flexible pipe 7d interconnecting the other open end of the pipe 7c and the other end of the pipe 7a. The flexible pipe 7d may be simply a straight tube or a bellows-like tube made of a flexible material such as a rubber or a synthetic resin. Thus, the working fluid passage 7 has a heat absorbing section and a heat discharging section which are separated or isolated at an intermediate heat exchanger comprising the enlarged closed end part 8 of the pipe 7b and the pipe 7c enclosed in the enlarged end part 8. Therefore, the portions of the working fluid respectively on the heat receiving and heat discharging sections are kept separate and cannot intermix.

A thin pipe 9 for restricted communication with the atmospheric pressure is communicatively connected at its one end to the pipe 7c, and its other end opens into the interior of a working field reservoir tank 10. A cover 10a with a through hole 10b is preferably used to cover this tank 10.

The space heating system of the construction described above operates in the following manner. The heat absorbing element 2 of the heat pipe H, which element 2 is disposed within the engine exhaust pipe 1, is heated by the engine exhaust gas, and the working fluid (liquid) within the heat absorbing element 2 absorbs the heat thus transferred into the element 2 and is vaporized. The working fluid thus vaporized and under increased pressure is sent axially through the diametrically central parts of the pipe 7a and the flexible pipe 7d of the working fluid passage 7 and into the closed pipe 7c, where it heats the working fluid within the closed end part 8 of the pipe 7b of the heat discharging section. As a result, the working fluid in the heat discharging section vaporizes and, passing through the diametrically central part of the pipe 7b, is conducted into the heat discharging element 5.

The vaporized working fluid thus introduced into the heat discharging element 5 undergoes heat exchange with cool air flowing through the air duct 4 and, being thus cooled, condenses. The working fluid thus liquefied flows downward under the force of gravity to the enlarged end part 8 of the pipe 7b, where it undergoes heat exchange with the vapor within the pipe 7c. On the other hand, the working fluid which has condensed within the pipe 7c flows further downward along the inner wall surfaces of the flexible pipe 7d and the pipe 7a and thus returns to the interior of the heat absorbing element 2.

Thereafter, the above described operational cycle is repeated, whereby the cool air within the air duct 4 is heated and, thus becoming warm air, is sent into the space S. This warm air thus supplied into the space S is eventually conducted through a suitable passage (not shown) and returned to the upstream end of the air duct 4, thereby flowing through the duct 4 and again being heated as it passes the heat discharging element 5.

An undesirable operational condition will now be considered. It will be assumed that, at the time of heating by the above described operation of the heat pipe H, an adverse condition such an abnormal rise of the temperature within the engine exhaust pipe 1 occurs and gives rise to an increase of the rate of heat input into the heat absorbing element 2 of the heat pipe H, whereby the pressure within the heat pipe H rises excessively.

In such a case, the vapor pressure within the pipe 7c forces the vapor of the working fluid out of the pipe 7c and causes it to flow through the pipe 9 into the reservoir tank 10. Thus it is possible to prevent an excessive pressure rise within the heat pipe H. Furthermore, in the reservoir tank 10, the working fluid is liquefied and closes the open end of the pipe 9 communicative with the atmospheric pressure. Therefore, atmospheric air is prevented from flowing into the pipe 9 for communication with the atmospheric pressure.

When the abnormal temperature rise within the engine exhaust pipe 1 stops, the pressure within the heat pipe H begins to drop and is cuased by the stopping of the engine to become equal to or less than the atmospheric pressure. Consequently, the working fluid undergoes reverse flow from the reservoir tank 10 and again returns into the heat pipe H.

Also in the case where, because of occurrences as described above, the rate of heat absorption by the heat absorbing element 2 becomes excessive, the pressure within the heat pipe H is automatically adjusted, and damage or breakage thereof is prevented. Moreover, excessive increase in the rate of heat discharge by the heat discharging element 5 is suppressed as a consequence of flowing out of the working fluid.

Furthermore, since the interior of the heat pipe H on its heat absorbing section is made communicable with the atmospheric pressure, the assembly work is easier than that in the case of a conventional heat pipe of vacuum sealed type. Furthermore, the construction of the heat pipe H, wherein the working fluid passage 7 is divided into a heat absorbing section and a heat discharging section, facilitates assembly and installation of the system particularly on a vehicle. Another feature is the use of the flexible pipe 7d, which effectively shuts off the transmission of vibration from the exhaust pipe 1.

Figure 2:
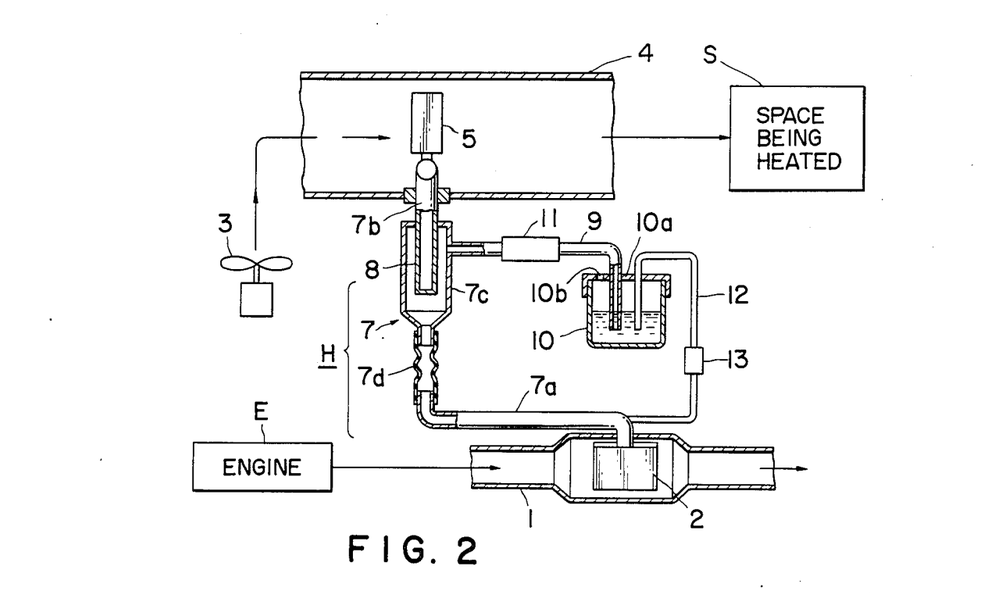
FIG. 2 is a schematic diagram similar to FIG. 1 showing another form of the system according to this invention.

FIG. 2 shows another form of the space heating system according to this invention. This form is different from the embodiment shown in FIG. 1 in the following. In the form of FIG. 2, the heat exchanger between the heat absorbing section and the heat discharging section is made up of a closed end part 8 which is not enlarged, and an enlarged pipe 7c which forms a working fluid chamber enclosing the end part 8.

Figure 3:
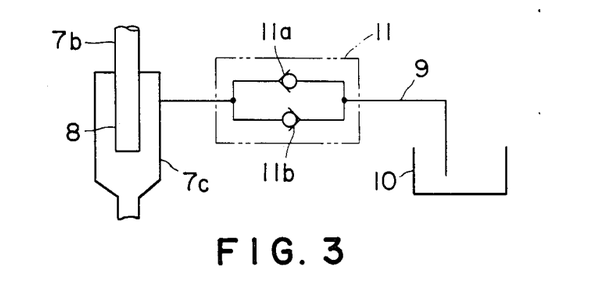
FIG. 3 is a schematic diagram showing the internal arrangement of valve mechanisms in a check valve shwon in FIG. 2.

Furthermore, a check valve device 11 is inserted in the pipe 9. As illustrated in FIG. 3, the check valve device 11 may comprise, in parallelly connected combination, a first check valve 11a which opens only for flow in the direction toward the working fluid reservoir tank 10 and a second check valve 11b which opens under a small pressure difference only for flow in the direction toward the enlarged pipe 7c. The first check valve 11a can be preset to open when the working fluid pressure within the pipe 7c exceeds, for example, 1 atmosphere (atm.). The opening pressure of the first check valve 11a can also be preset at any value such as, for example, 1.5 atm. or 2 atm.

In the space heating system of FIG. 2, the pressure within the heat pipe H in its heat absorbing section can be adjusted by the check valve device 11, and, accordingly, the pressure in the heat discharging section can also be adjusted. For example, in the case where the opening pressure of the first check valve 11a is preset at 1 atmosphere, if the working fluid is water, its temperature will never exceed 100° C. Thus, since the pressure within the heat pipe H can be adjusted in this manner, the maximum temperature (i.e., vaporization temperature) of the working fluid on the heat absorbing section is adjustable. Therefore, these possibilities afford further possibilities. For example, it becomes possible to improve the performance of the heat pipe H by increasing the temperature of the heat input part on the heat discharging section or to freely use as the working fluid a Freon or an alcohol which readily undergoes thermal decomposition or an antifreeze liquid by limiting the maximum temperature.

In the above described space heating system shown in FIG. 2, when the pressure within the heat pipe H drops, the working fluid returns from the reservoir tank 10 via the pipe 9 into the heat pipe H. However, it is also possible, instead, to use a return flow pipe 12 exclusively for return of the working fluid from the reservoir tank 10 directly into the heat pipe H. This return flow pipe 12, which is provided with a check valve 13 for preventing reverse flow toward the reservoir tank 10, is preferably connected at its downstream end directly to the pipe 7a at a point thereof near the heat absorbing element 2. In this case, the second check valve 11b of the check valve device 11 is omitted.

Figure 4:
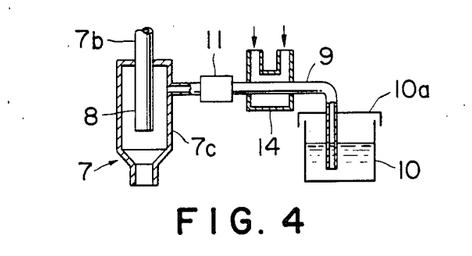
FIG. 4 is a partial schematic diagram of a modification of the system illustrated in FIG. 2.

In a modification of this invention as shown in FIG. 4, a cooling device 14 is installed at an intermediate part of the pipe 9 and operates, when the rate of flow of discharged vapor is high, to condense discharged vapor.

It will be understood that the space heating systems described above provide the following advantageous features. Since the interior of the heat absorbing section of the heat pipe is interconnected by the pipe for communication with the atmospheric pressure to be working fluid reservoir tank, when the pressure within the heat pipe rises and exceeds a specific value, the working fluid is released to the outside thereby to prevent damage or breakage of the heat pipe, and, at the same time, excessive increase in the rate of heat discharge by the heat discharging element can be prevented. Moreover, since the internal pressure of the heat pipe can be set as desired in the system of FIG. 2, it is possible to select the working fluid from a great variety of fluids and to improve the performance of the heat pipe. Furthermore, since a working fluid reservoir tank is provided, infiltration of the atmospheric air into the heat pipe can be prevented, and working fluid which has once flowed out can be returned by reverse flow into the heat pipe.

Figure 5:
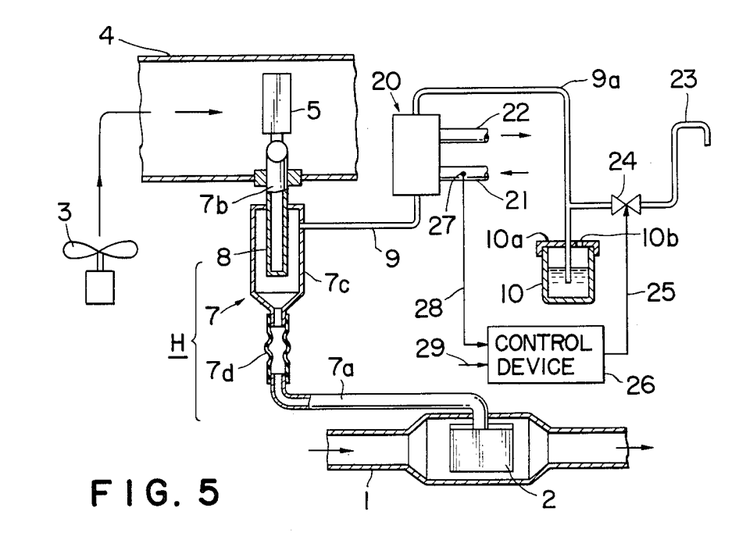
FIG. 5 is a schematic diagram similar to FIG. 1 showing a form of the space heating system of the invention in a second aspect thereof.

In FIG. 5 illustrating another form of the space heating system according to the invention in a second aspect thereof, parts which are the same as or equivalent to corresponding parts in FIGS. 1 through 4 are designated by the same reference numerals and characters. Detailed description of such parts will not be repeated.

Figure 6:
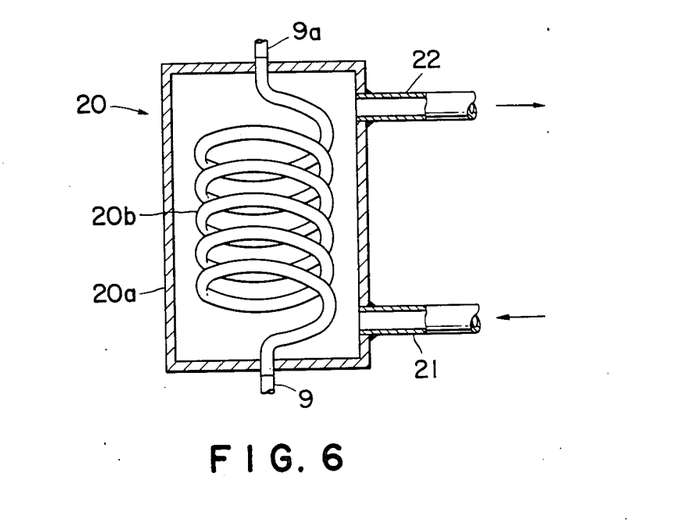
FIG. 6 is a side view, partly in section, of a condenser used in the system illustrated in FIG. 5.

As shown, the pipe 9 has a condenser 20, which comprises, as shown in FIG. 6, a case 20a in the form of a sealed vessel and a heat-exchange tube 20b disposed within the case 20a and connected at one end to one end of the above mentioned pipe 9. To the case 20a are connected an inlet pipe 21 and an outlet pipe 22 for the engine cooling water, which, as it flows through the case 20a and past the heat-exchange tube 20b, cools and liquefies the vaporized working fluid in the tube 20b and thereafter is discharged through the outlet pipe 22.

The other end of the heat-exchange tube 20b is connected to one end of a pipe 9a, the other end of which extends downwardly into a reservoir tank 10, the interior of which is open through an air vent hole 10b to the atmosphere. The open extremity of the pipe 9a is submerged in the liquefied working fluid stored in the reservoir tank 10. The working fluid which has been liquefied as described above in the condenser 20 is forced out of the condenser by the pressure within the chamber 7c of the heat exchanger and, flowing through the pipe 9a, is stored as the liquefied working fluid in the reservoir tank 10. At the same time, this liquefied working fluid is caused by the syphoning effect accompanying a drop in the pressure within the chamber 7c to return by way of the condenser 20 into the chamber 7c.

To an intermediate part of the above mentioned pipe 9a is connected the proximal root end of a branch pipe 23, the other distal end of which is open to the atmosphere. A control valve 24, which is normally closed but is opened in response to an "OPEN" command 25 from a control device 26, is provided at an intermediate part of the branch pipe 23.

The control device 26 receives an engine cooling water temperature signal 28 from a water temperature sensor 27 installed in the aforementioned inlet pipe 21 of the condenser 20 and a heating ON/OFF signal 29 and transmits the "OPEN" command 25 when the engine cooling water temperature exceeds a preset value and when the space heating is turned OFF. Then, when the control valve 24 is opened by the "OPEN" command 25, the return of the liquefied working fluid within the reservoir tank 10 to the heat pipe H is prevented.

The space heating system of the above described organization operates in the following manner.

The working fluid within the heat absorbing element 2 is heated by engine exhaust gas flowing through the exhaust pipe 1 and evaporates. Since the interior of the heat pipe H is communicatively open to the atmosphere, the working fluid within the heat absorbing element 2 vaporizes at the atmospheric pressure. The operation of the heat pipe H of FIG. 5 is substantially the same as that of the heat pipe H of FIG. 2. When the space S (FIG. 2) is heated by the continuous repetition of the above described operation, and when the engine E (FIG. 2) warms up and its exhaust gas temperature becomes high, the temperature within the heat absorbing element 2 also rises. The pressure within the heat pipe thereby increases, and the vaporized working fluid within the chamber 7c ultimately passes through the pipe 9 and reaches the condenser 20.

In the condenser 20, this vaporized working fluid undergoes heat exchange with the engine cooling water and is liquefied. This liquid working fluid is forced out of the condenser 20 by the pressure within the chamber 7c and is stored as liquefied working fluid in the reservoir tank 10. As a consequence, the quantity of the working fluid within the pipes 7a, 7c and 7d is reduced, and, since the rate of heat exchange decreases by that much, it becomes possible to maintain constant the rate of heat exchange in the heat exchanger 7c, 8 even when the exhaust gas temperature rises.

In the case where, because of a change in an engine operational condition such as, for example, a decrease in the power output as high speed to an idling condition under no load, the exhaust gas temperature drops, the pressure within the pipes 7a, 7c and 7d decreases to atmospheric or lower pressure. Then, as a result of a syphoning effect, the liquid working fluid in the reservoir tank 10 is returned through the condenser 20 to the heat exchanger 7c, 8. The quantity of the working fluid within the pipes 7a, 7c and 7d is thereby increased, and the rate of heat exchange becomes higher by that much, whereby the rate of heat exchange in the heat exchanger 7c, 8 is maintained constant.

In the case where, for example, the engine power output and speed are again raised after a short idling period, and the exhaust gas temperature again rises before the engine cooling water temperature drops, surplus working fluid in the pipes 7a, 7c and 7d is sent by way of the condenser 20 to the reservoir tank 10 by the rise in the exhaust gas temperature. However, since the engine cooling water temperature is high as stated hereinabove, the vaporized working fluid from the heat exchanger 7c, 8 is sent as it is in its vapor state to the reservoir tank 10 without being liquefied in the condenser 20. For this reason, boiling occurs within the reservoir tank 10.

In the instant system, since the control valve 24 is opened in such a case to permit the vapor to escape, boiling of the liquefied working fluid in the reservoir tank 10 can be prevented.

More specifically, the temperature of the engine cooling water supplied to the condenser 20 is continually detected by the water temperature sensor 27 installed in the inlet pipe 21, and the resulting water temperature signal 28 generated thereby is transmitted, together with a heating ON/OFF signal 29, to the control device 26. The control device 26 operates in the case where it determines, from the water temperature signal 28, that the water temperature exceeds a preset value and in the case where it determines, from the heating ON/OFF signal 29, that heating is not necessary, to transmit the "OPEN" command 25 to the control valve 24, which is thereby opened.

When the control valve 24 is thus opened as a result of the engine cooling water temperature exceeding the preset value, the vaporized working fluid from the condenser 20 is discharged into the atmosphere by way of the branch pipe 23 without being returned to the reservoir tank 10. For this reason, boiling within the reservoir tank 10 is prevented.

On the other hand, when the control valve 24 is opened for the reason that heating has become unnecessary, the return of the liquefied working fluid in the reservoir tank 10 to the chamber 7c is prevented, and heating is fully turned off. In this case, it is preferable that the working fluid within the pipes 7a, 7c and 7d be completely extracted beforehand.

It will be understood that by the organization and operation of the space heating system as described above, boiling in the reservoir tank 10 is prevented even in the case where the temperature of the engine cooling water becomes high, and the vaporized working fluid is not liquefied in the condenser 20.

Furthermore, during a period wherein heating is not necessary, the heat pipe H is fully stopeed, and heating is turned off.

While, in the above described system, an intermediate part of the pipe 9a is adapted to be openable and closeable by the use of the branch pipe 23 and the control valve 24, other arrangements are also applicable according to this invention. For example, an opening which is directly openable and closeable can be provided in the wall of the pipe 9a.

Figure 7:
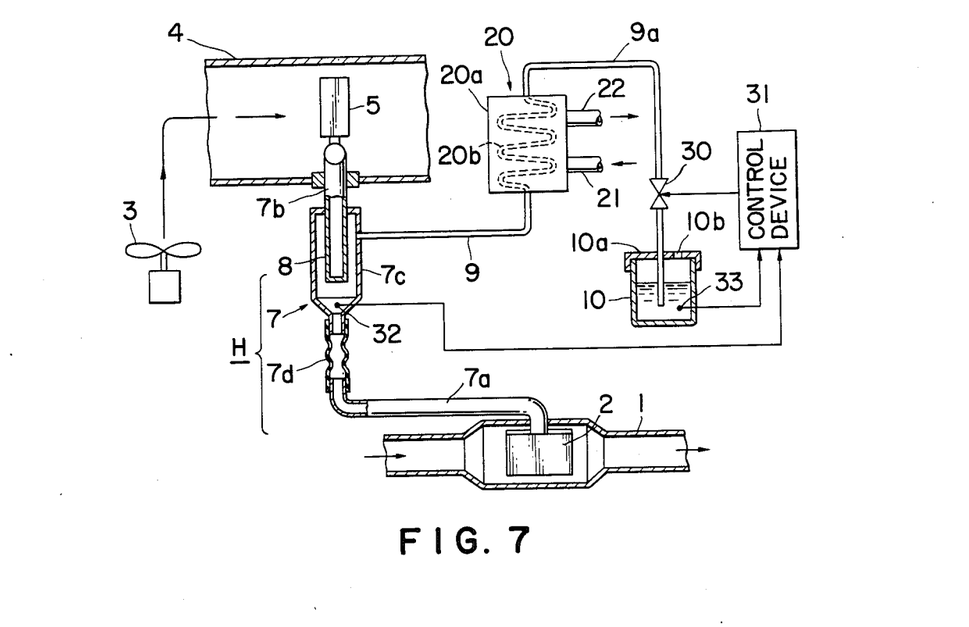
FIG. 7 is a schematic diagram similar to FIG. 1 showing a form of the system of the invention in a third aspect thereof.

Another space heating system of the invention in a third aspect thereof is shown in FIG. 7, in which parts which are the same as or equivalent to corresponding parts in FIGS. 5 and 6 are designated by the same reference numerals.

The organization and operation of the instant system are for the most part the same as those of the preceding embodiment. Therefore, only the points of difference will now be described.

The pipe 15 between the condenser 20 and the reservoir tank 10 is provided at an intermediate part thereof with an automatically controllable valve 30, which, by its opening and closing action, establishes or shuts off communication of the chamber 7c with the outside atmosphere. This valve 30 opens and closes in response to control signals from a control device 31.

The control device 31 operates in turn in response to a pressure signal from a pressure sensor 32 for detecting the pressure within the chamber 7c and to a liquid level signal from a liquid level sensor 33 for detecting the liquid level of the liquefied working fluid in the reservoir tank 10. The control device 31 thus operates to transmit a "CLOSE" command signal to the valve 30 when the pressure signal from the pressure sensor 32 indicates a pressure below a preset value and when the level signal from the level sensor 33 indicates a level of the liquid working fluid exceeding a preset limit. In all other cases, the control device 31 transmits an "OPEN" command signal.

Since the interior of the heat absorbing section of the heat pipe H is open to the atmosphere by way of the pipes 9 and 7a, the working fluid within the heat absorbing element 2 does not evaporate unless its temperature reaches its evaporation temperature at atmospheric pressure. For this reason, when the exhaust gas temperature is still low during the initial period of starting of the engine, the working fluid within the heat absorbing element 2 does not evaporate, and heating of the space S (FIG. 2) cannot be carried out.

Accordingly, in the system of the instant system, the pressure within the heat exchanger chamber 7c is continually detected by the pressure sensor 32, and, when the pressure thus detected becomes less than the preset value, the control device 31 operates to transmit a "CLOSE" command signal for closing the valve 30.

When the valve 30 is thus closed, the heating pipe H is switched from the mode open to the atmosphere to a sealed mode, and, in a state wherein the heat pipe H has been fully stopped, the interior of the heat pipe is held at a pressure less than the atmospheric pressure. For this reason, when the heat pipe H is activated, the working fluid within the heat absorbing element 2 evaporates at a lower temperature than in a mode open to the atmosphere, and the working fluid thus vaporized is sent into the heat exchanger chamber 7c to transmit heat by heat exchange to the heat pipe. That is, in the case where the heat pipe is caused to become one of the sealed mode, it becomes capable of functioning from a lower temperature region, whereby heating of the space S becomes possible even with a low-temperature heat source.

When the engine exhaust gas temperature rises to increase the rate of heat transfer, and the system assumes an amply effective state (i.e., the internal pressure becoming 1 kg/cm$^2$, absolute) even for an open mode, the pressure sensor 32 detects this state and activates the control device 31 to transmit an "OPEN" command signal to open the valve 30 thereby to return the heat pipe to the mode open to the atmosphere. The heat transfer for heating the space S is thus resumed.

When the liquid working fluid in the reservoir tank 10 is returned to the heat exchanger chamber 7c, and the level of the liquid working fluid remaining in the tank 10 descends to the level of the level sensor 33, the level sensor 33 detects this state and transmits a signal which causes the control device 31 to close the valve 30. The return of the liquid working fluid in the reservoir tank 10 to the chamber 7c is thereby suppressed, and the quantity of the working fluid in the heat pipe is continually maintained at a suitable value.

Thus, when the engine exhaust gas temperature is low, the heat pipe is caused to take the sealed mode, whereby the heat pipe can be operated from a lower temperature region to carry out space heating. Furthermore, in the case where the pressure within the chamber 7c exceeds a preset value, the heat pipe is switched to the mode open to the atmosphere, whereby the quantity of the working fluid within the heat pipe can be controlled, and at the same time, even in the case of an abnormal rise in the pressure within the heat pipe, rupturing of the same can be prevented. Another feature of this embodiment is that, by the provision of the level sensor 33, the quantity of the liquid working fluid in the reservoir tank 10 returning to the heat pipe is controlled, whereby the quantity of the working fluid within the heat pipe can be continually maintained at a suitable value.

While, in the above described embodiment, the valve 30 is provided in an intermediate part of the pipe 9a between the condenser 20 and the reservoir tank 10, it may be installed at other positions such as, for example, between the chamber 7c and the condenser 20.

Figure 8:
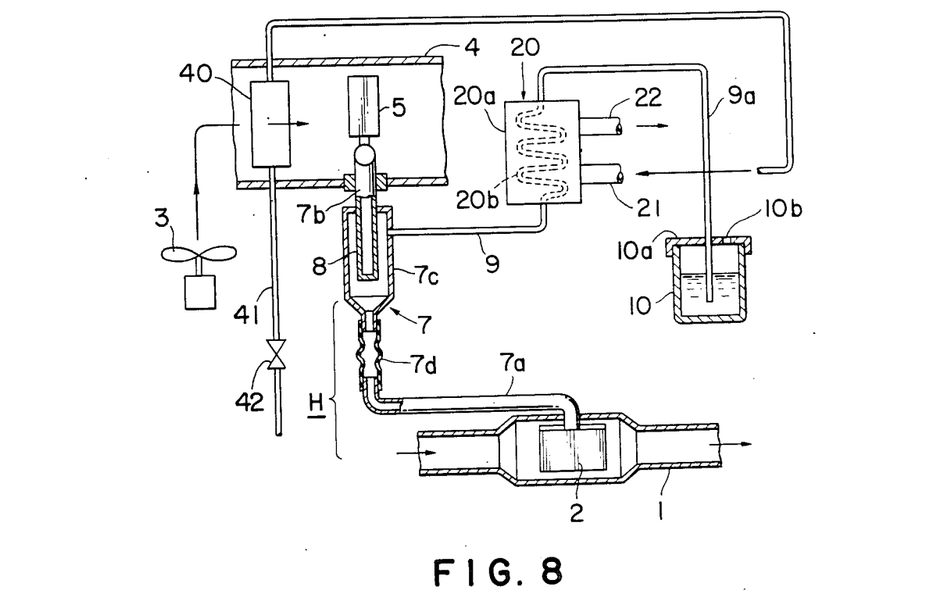
FIG. 8 is a schematic diagram similar to FIG. 1 showing a form of the system of the invention in a fourth aspect thereof.

Still another space heating system of this invention in a fourth aspect thereof will now be described with reference to FIGS. 8, 9, and 10. In FIG. 8 those parts which are the same as or equivalent to corresponding parts in FIGS. 5 and 6 are designated by the same reference numerals.

The organization and operation of the instant embodiment are for the most part the same as those of the preceding two embodiments. Therefore, only the points of difference will now be described.

In the instant system, a heater core 40 is installed in the air duct 4 at a position upstream of the heat discharging element 5 of the heat pipe. Engine cooling water from the element E (FIG. 2) is supplied through this heater core 40, where the water gives up heat by heat exchange to the air flowing through the air duct 4 and is then conducted into the case 20a of the condenser 20 through the inlet pipe 21. The heater core 40 is supplied with the engine cooling water through an inlet piping 41, in which is installed a two-way valve 42 for controlling the rate of supply of the engine cooling water to the heater core 40, as shown in FIGS. 8 and 9, whereby to regulate the rate of heat exchange at the heater core 40. This two-way valve 42 is controllably placed in its fully closed state when a space temperature regulating level (not shown) is turned to its "FULL COOL" position.

Figure 9:
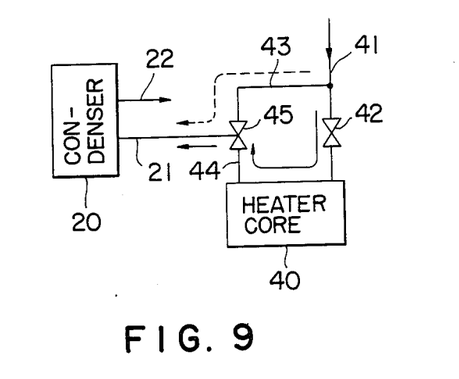
FIG. 9 is a piping diagram showing the organization of a bypass device in the system shown in FIG. 8.

To the inlet side of the two-way valve 42 of the inlet piping 41 of the heater core 40 is connected one end of a bypass pipe line 43, the other end of which is connected to a three-way valve 45 together with the outlet piping 44 of the heater core 40 and the upstream end of the inlet pipe 21 of the condenser 20 as shown in FIG. 9. This three-way valve 45 and the bypass pipe line 43 constitute a bypass means for supplying engine cooling water to the condenser 20 by bypassing the heater core 40 when the two-way valve 42 is fully closed.

Figure 10:
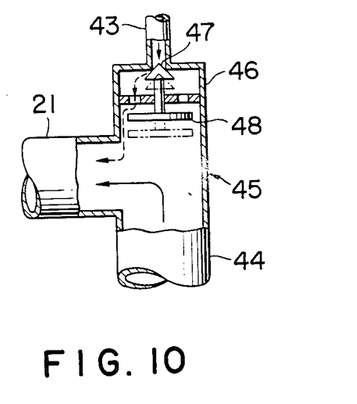
FIG. 10 is a side view, with parts shown in section, showing in detail essential parts of a three-way valve used in the bypass device shown in FIG. 9.

More specifically, as shown in FIG. 10, the three-way valve 45 comprises, for example, a valve box 46 to which are connected the inlet pipe 21, the bypassing pipe line 43, and the outlet piping 44 and a unitary structure comprising a valve member 47 and a plunger 48 and adapted to move freely in its axial direction. When the two-way valve 42 is open, and the engine cooling water is flowing through the heater core 40 as indicated by solid arrow line in FIGS. 9 and 10, the plunger 48 is pushed by water pressure in the direction for causing the valve member 47 to close the bypass pipe line 43 as indicated by solid line in FIG. 10. On the other hand, when the two-way valve 42 is fully closed, and the engine cooling water is no longer discharged out of the outlet piping 44, the valve member 47 and the plunger 48 move away from the closure position of the valve member 47 as indicated by imaginary line in FIG. 10, and the engine cooling water flows as indicated by imaginary arrow lines in FIGS. 9 and 10 and is supplied to the condenser 20.

The operation of the heater core 40 and associated parts will now be described. When the engine E is started, its cooling water of rising temperature is conducted through the two-way valve 42, which is in its opened state, to the heater core 40 to undergo heat exchange with the air flowing through the air duct 4. Thereafter this cooling water passes through the three-way valve 45 and is conducted through the condenser 20 to return to the engine through the outlet pipe 22.

While the heat discharging element 5 of the heat pipe functions promptly in operation, it cannot transfer heat to the air in the duct 4 at a high rate. On the other hand, the heater core 40 is somewhat slow in functioning but is capable of transferring heat at a high rate to the air. For this reason, by installing the heat discharging element 5 of a heat pipe and a heater core 40 in the air duct 4, heating of the space S can be started immediately after the engine is started, and, moreover, heating at an amply high rate can be carried out.

As mentioned hereinbefore, when a space temperature regulating lever is turned to its "FULL COOL" position, the two-way valve 42 is controllably placed in its fully closed state. The supply of engine cooling water to the heater core 40 is thereby shut off. If it were not for the aforedescribed bypass device, the supply of the cooling water to the condenser 20 would also be shut off, and the cooling water within the condenser 20 would become stagnant, and its temperature would gradually rise, whereby there would arise the possibility of the condenser 20 being unable to liquefy the vapor-phase working fluid from the heat exchanger chamber 7c.

In the instant embodiment, however, when the two-way valve 42 is fully closed, the bypass means operates to cause the engine cooling water to bypass the heater core 40 and be supplied to the condenser 20. Therefore there is no possibility whatsoever of the condenser 20 failing the liquefy the above mentioned vaporized working fluid. More specifically, when the two-way valve 42 is fully closed, and the engine cooling water is no longer sent out through the outlet pipe 44 of the heater core 40, the valve member 47 and the plunger 48 descend to the position indicated by imaginary line in FIG. 10. The bypass pipe line 43 is thereby opened, and the cooling water thereupon flows as indicated by imaginary arrow lines in FIGS. 9 and 10 and is thus supplied into the condenser 20.

Thus, since the engine cooling water is supplied to the condenser 20 even when the two-way valve 42 is fully closed, the vaporized working fluid from the heat exchanger chamber 7c can be positively liquefied in the condenser 20. For this reason, there is no possibility whatsoever of the vaporized working fluid being sent directly to the reservoir tank 10 to cause explosive evaporation (bumping) therein. As a result, it becomes possible to maintain the heat exchange rate in the heat exchanger between the heat absorbing and discharging sections continually at a constant value.

While, in the instant embodiment, a valve of a construction wherein a flow path is changed by liquid pressure is used for the three-way valve 45, a three-way valve 45 of a construction wherein it changes the flow path in interlocking relationship with the two-way valve 42 may be used.

As described above, this invention in the fourth aspect thereof provides a space heating system in which, when a control valve for controlling the rate of supply of engine cooling water to a heater core is fully closed, the engine cooling water is caused to bypass the heater core and be supplied to the condenser by a bypass means, whereby the vaporized working fluid from the heat exchanger chamber is positively liquefied in the condenser, and explosive evaporation (bumping) in the reservoir tank is prevented.

Figure 11:
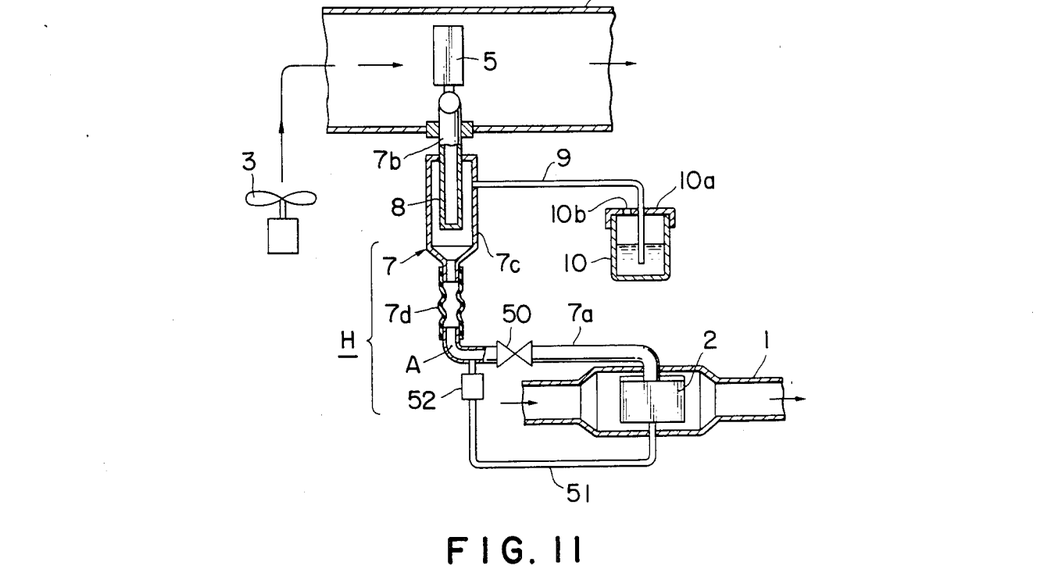
FIG. 11 is a schematic diagram similar to FIG. 1 showing a form of the system of the invention in a fifth aspect thereof.

A further form of the space heating system of this invention in a fifth aspect thereof will now be described with reference to FIGS. 11 and 12. In FIG. 11, those parts which are the same as or equivalent to corresponding parts in FIG. 2 are designated by the same reference numerals.

The organization and operation of the instant embodiment are for the most part the same as those of the second embodiment described hereinbefore. Therefore only the points of difference will now be described.

In this embodiment, a control valve 50 is provided in an intermediate part of the pipe 9 for the purpose of preventing the working fluid which has condensed as a result of heat exchange in the working fluid chamber 7c from returning to the heat absorbing element 2 in the exhaust pipe 1. A part A of the pipe 7a between this control valve 50 and the flexible pipe 7d is connected by way of a bypass pipe 51 having a relief valve 52 to the bottom part of the heat absorbing element 2.

Figure 12:
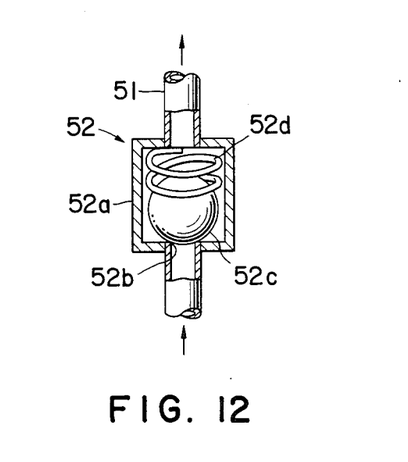
FIG. 12 is a side view in longitudinal section showing in detail the construction of a relief valve used in the system shown in FIG. 11.

As shown in FIG. 12, this relief valve 52 comprises essentially a valve case 52a, a valve seat part 52b formed at the bottom or inlet part of the case 52a, a spherical (or ball) valve 52c for operating cooperatively with the valve seat part 52b to open and close the valve, and a compression coil spring 52d for exerting a specific spring force on the ball valve 52c to urge the same toward the valve seat 52b. This relief valve 52 opens when the vapor pressure within the heat absorbing element 2 exceeds a preset value as determined by the spring force of the spring 52d and permits the working fluid within the heat absorbing element 2 to flow into the part A of the pipe 7a.

When the heating is to be turned off after a period of operation of the system of the instant form, the normally fully opened control valve 50 is closed. The working fluid which has condensed in the heat exchanger chamber 7c is thereby stopped from returning to the heat absorbing element 2. Furthermore, the vapor of the working fluid which has evaporated in the heat receiving element 2 forces the liquid working fluid which has accumulated at the bottom of the element 2 to flow through the bypass pipe 51 toward the relief valve 52. Then, when this vapor pressure exceeds the preset pressure of the relief valve 52, the ball valve 52c of the relief valve 52 separates from the valve seat part 52b, whereby the relief valve 52 becomes open to permit the working fluid to flow into and accumulate in the portion A of the connecting pipe 7a. Thus, the heat absorbing element 2 no longer contains the working fluid. As a consequence, the heat transfer function of the heat pipe is completely stopped, and the heating can thereby be stopped instantaneously and fully.

When heating is to be started, the control valve 52 is opened, whereupon the working fluid which has been accumulated in the portion A of the connecting pipe 7a returns into the heat absorbing element 2, and the heat transfer function of the heat pipe is immediately started.

As described above, the invention in the fifth aspect thereof provides a space heating system in which, in a part of the connecting pipe on the heat absorbing portion of a heat pipe joining the heat absorbing element in the engine exhaust pipe and the heat discharging element in the air duct, a control valve is provided, and, a portion of the same connecting pipe on the working fluid outlet side of this control valve, is connected via a bypass pipe having a relief valve to the bottom of the heat receiving element. Therefore, turning on and off of the spase heating can be carried out instantaneously and fully, and, moreover, even when an antifreeze liquid has been used as to the working fluid, there is no possibility of the antifreeze liquid remaining in the heat absorbing element and being decomposed by the heat from the engine exhaust gas.

What is claimed is:

1. A space heating system utilizing the exhaust gas heat of an engine to heat a space, said system comprising:
   an air duct connected at a downstream end thereof to said space;
   an air propelling means for propelling air through the air duct into the space;
   a heat pipe containing a working fluid and comprising a heat absorbing element disposed within a stream of said exhaust gas to receive heat therefrom, a heat discharging element disposed within the air duct to discharge heat thereinto, and working fluid passage means connecting the heat absorbing and heat discharging elements in a manner to conduct the working fluid in two-way flow between said elements thereby to transfer heat from the heat absorbing element to the heat discharging element, said heat pipe being separated, at an intermediate heat exchanger provided in the working fluid passage means, into a heat absorbing section and a heat discharging section which are mutually heat exchangeable at said heat exchanger;
   a working fluid reservoir tank open to the atmosphere; and
   pipe means for communication with the atmospheric pressure which communicatively connects said heat absorbing section at said intermediate heat exchanger to said tank to allow outflow of the working fluid from the heat absorbing section toward and into the tank when the pressure within the heat absorbing section rises.

2. A space heating system as claimed in claim 1 wherein said pipe means for communication with the atmospheric pressure has check valve means comprising a first check valve which opens only for permitting flow of the working fluid toward said reservoir tank and a second check valve which opens only for permitting flow in the reverse direction, the first and second check valves being connected in parallel connection to the other parts of said pipe.

3. A space heating system as claimed in claim 1 wherein said pipe means for communication with the atmospheric pressure is a thin tube of a small inner diameter which normally restricts the outflow of the working fluid in the heat pipe and, when the internal pressure within the heat pipe becomes excessive, permits release of the working fluid.

4. A space heating system as claimed in claim 1 wherein said pipe means for communication with the atmospheric pressure has a check valve which opens only for permitting flow of the working fluid toward said reservoir tank and there is provided second pipe means communicatively connecting the reservoir tank to the heat absorbing section at a position near the heat absorbing element, said second pipe means having therein a check valve preventing flow toward the reservoir tank.

5. A space heating system as claimed in claim 1, further comprising a vapor condenser inserted in said pipe means for communication with the atmospheric pressure, said condenser being connected to the engine so as to be supplied with engine cooling water from the engine to condense and liquefy the working fluid flowing therethrough toward the reservoir tank.

6. A space heating system as claimed in claim 5, further comprising normally closed opening means provided in said pipe means for communication with the atmospheric pressure at a position between said vapor condensor and said reservoir tank, said opening means, when opened, releasing the working fluid to the outside before the fluid reaches the reservoir tank.

7. A space heating system as claimed in claim 6, further comprising means for detecting the temperature of the engine cooling water being supplied to said condenser, and control means for receiving a signal from said detecting means and generating a command signal to said opening means to open the same, when the temperature of the engine cooling water exceeds a predetermined value.

8. A space heating system as claimed in claim 7 wherein said control means is connected to means for stopping the operation of the system to receive a signal therefrom when the operation of the system is stopped, said control means delivering a command signal to said opening means to open the same upon receiving the signal from said means for stopping the operation.

9. A space heating system as claimed in claim 5, further comprising a valve inserted in said pipe means for communication with the atmospheric pressure at a position between said vapor condenser and said reservoir tank, means for detecting the pressure within said heat absorbing section, and control means operative in response to the pressure within said heat absorbing section to open said valve when said pressure exceeds a predetermined value, thus allowing the working fluid within the heat absorbing section to flow into said reservoir tank.

10. A space heating system as claimed in claim 9 wherein there is provided means for detecting the quantity of working fluid within the reservoir tank, and said control means is associated with said means for detecting the quantity of working fluid such that upon receiving a signal of the detected quantity of working fluid below a predetermined value the control means generates a command signal to said valve to close the same, preventing flow of the working fluid within the reservoir tank back to the heat absorbing section.

11. A space heating system as claimed in claim 5, further comprising: a heater core disposed within the air duct at a position upstream of the heat discharging element of the heat pipe and supplied with said engine cooling water prior to the condenser to heat, by heat exchange, the air being propelled through the air duct; a control valve for controlling the rate of supply of the engine cooling water to the heater core; and bypass means for causing the engine cooling water to bypass the heater core and be supplied directly to the condenser when said control valve is fully closed.

12. A space heating system as claimed in claim 11 wherein said bypass means comprises: a three-way valve having first, second, and third ports, the first port being an inlet port freely communicating with the second port, which is an outlet port, the third port being an inlet port provided with valve means permitting inflow of water therethrough when the water pressure on the inlet side thereof exceeds that on the outlet side thereof; a bypass pipe line connected at one end to the inlet side of said control valve and at the other end to said third port; and an outlet pipe line connected at one end thereof to the water outlet of the heater core, the second port being connected to a cooling water inlet of the condenser.

13. A space heating system as claimed in claim 1, further comprising: an cutoff valve installed in said heat absorbing section; and a bypass pipe having a relief valve at an intermediate part thereof and communicatively connecting a part of said heat absorbing section on the side of said cutoff valve remote from the heat absorbing element to the heat absorbing element.

* * * * *